April 30, 1929.  F. DE LETTO ET AL  1,710,810

DIRIGIBLE HEADLIGHT

Filed Nov. 16, 1926  4 Sheets-Sheet 1

Inventors,
Frank DeLetto
and Julius Fuhr
By Daniel Brennan
Attorney

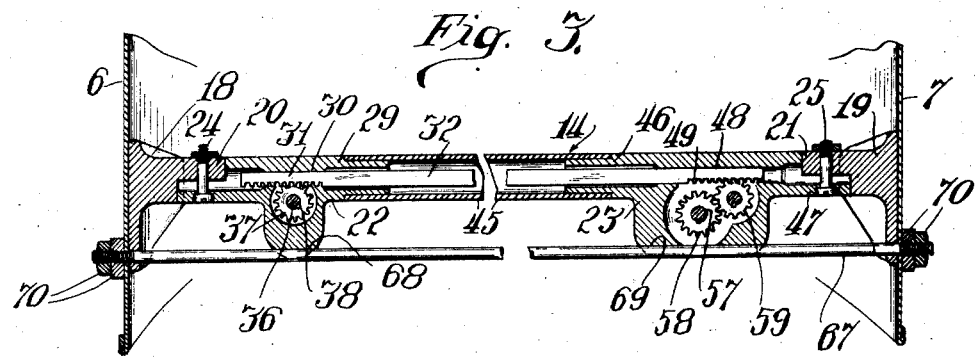

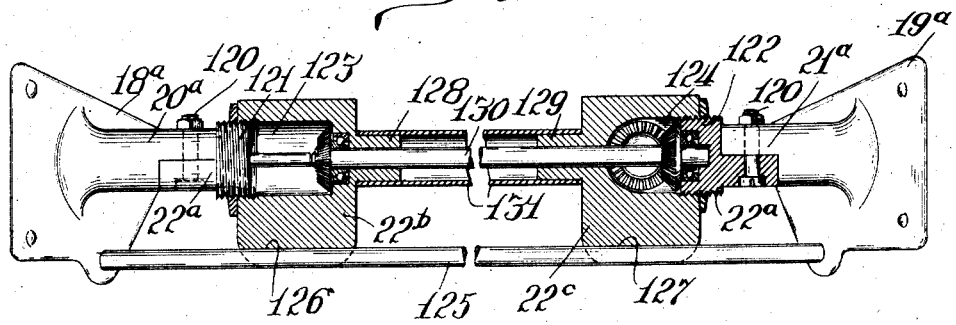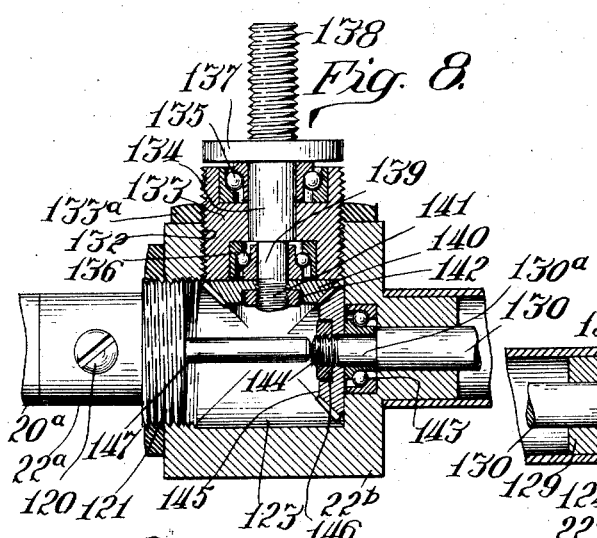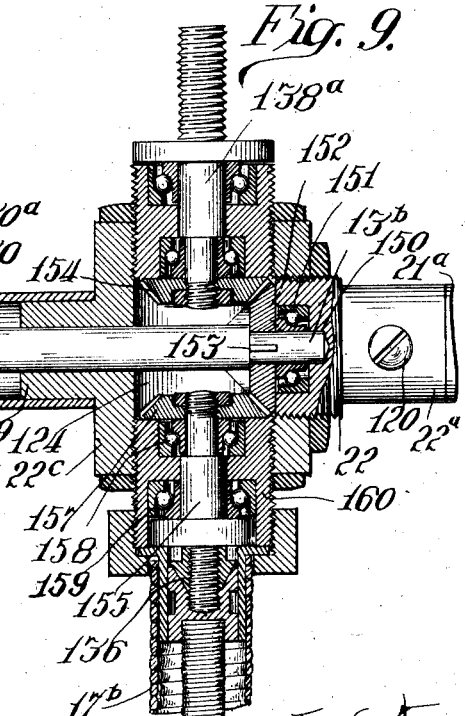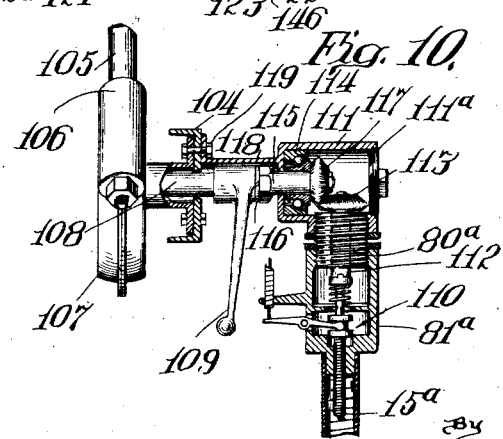

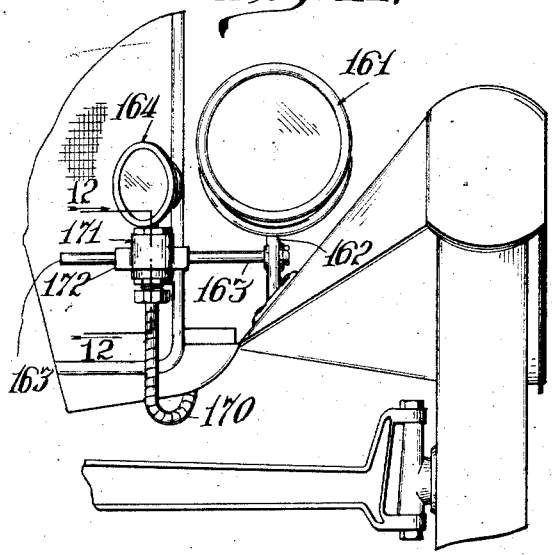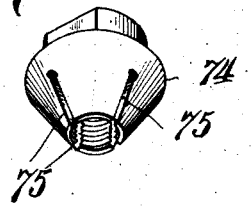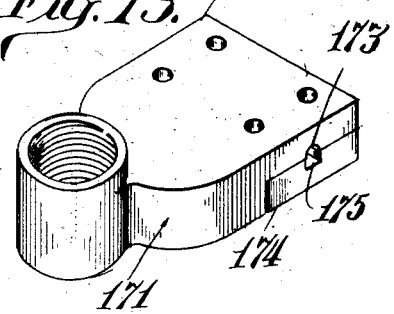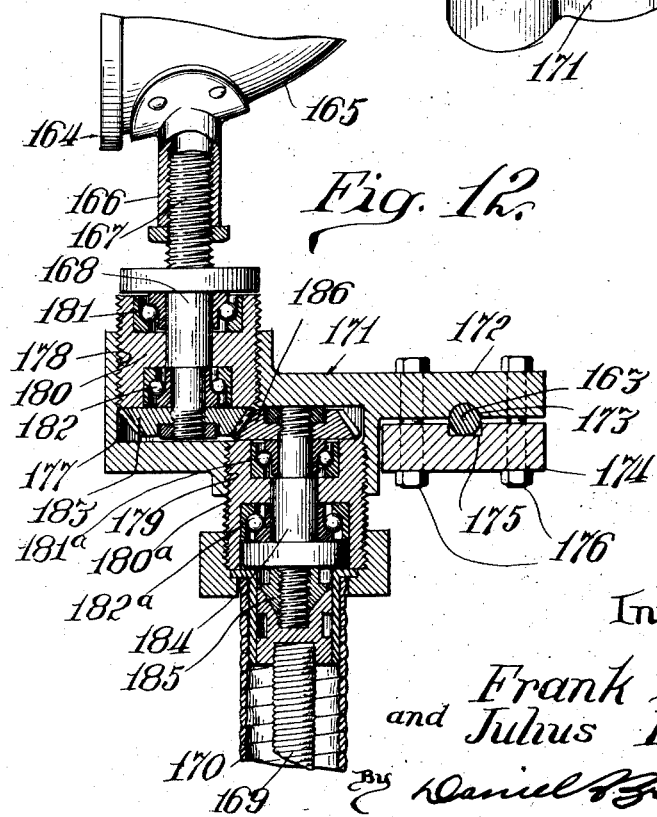

Patented Apr. 30, 1929.

1,710,810

UNITED STATES PATENT OFFICE.

FRANK DE LETTO AND JULIUS FUHR, OF CHICAGO, ILLINOIS.

DIRIGIBLE HEADLIGHT.

Application filed November 16, 1926. Serial No. 148,656.

This invention relates broadly to headlight operating mechanism for vehicles and, more particularly, to an improved unitary structure which may be applied to an automobile without materially changing the standard construction thereof or the standard construction of the steering mechanism whereby to provide a dirigible headlight.

The principal objects of this invention reside in the provision of an improved dirigible headlight mechanism in which the moving parts thereof are completely enclosed against dust and moisture and in which the mechanism, as a whole, with slight adjustment, may be readily applied in the desired position to the particular type of vehicle.

Another object of the invention is to provide a dirigible headlight operating mechanism which may be, from the driver's position, readily connected and disconnected for use; the provision of a dirigible headlight operating mechanism including a motion transmitting mechanism; the provision of an improved separable connection whereby the operator of the vehicle may connect or disconnect the headlights for automatic operation as he sees fit; the provision of an improved motion transmitting mechanism and an improved means for fixedly connecting the same to an element to be moved; and the provision of an improved dirigible headlight operating mechanism in which the mechanism is self-contained in a casing which may be made in any desired length to suit the particular vehicle to which it is to be applied for operating one of a plurality of headlights.

The foregoing and such other objects and advantages as may appear or be pointed out as this description proceeds are attained in the structural embodiment illustrated in the accompanying drawings, in which:

Figure 3 is a longitudinal transverse sectional view taken on the line 3—3 of Figure 1.

Figure 1:
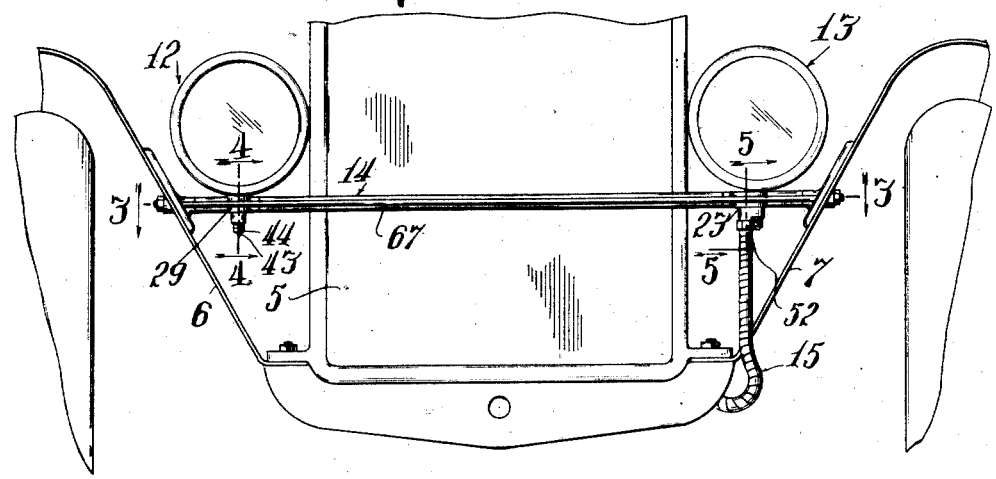
Figure 1 is an elevational view of the apparatus of this invention applied to a motor vehicle.

Figures 4 and 5 are vertical sectional views taken on the lines 4—4 and 5—5, respectively, of Figure 1 looking in the direction indicated by the arrows.

Figure 6 is a fragmentary sectional view showing a disconnectible connection employed in our invention.

Figure 7 is a view similar to Figure 3 of an alternative form of the invention.

Figure 8 is a vertical sectional view of a part of the device of Figure 7 showing the gearing at the left hand end of Figure 7.

Figure 9 is a view similar to Figure 8 showing the gearing at the right hand end of Figure 7.

Figure 10 is a further modified or alternative form of the invention showing a disconnectible connection and adjustment to the steering mechanism.

Figure 11 is a further modified or alternative form of the invention.

Figure 12 is a sectional view taken on the line 12—12 of Figure 11 looking in the direction indicated by the arrows, and Figures 13 and 14 are perspective views of details of parts of the invention.

Figure 2:
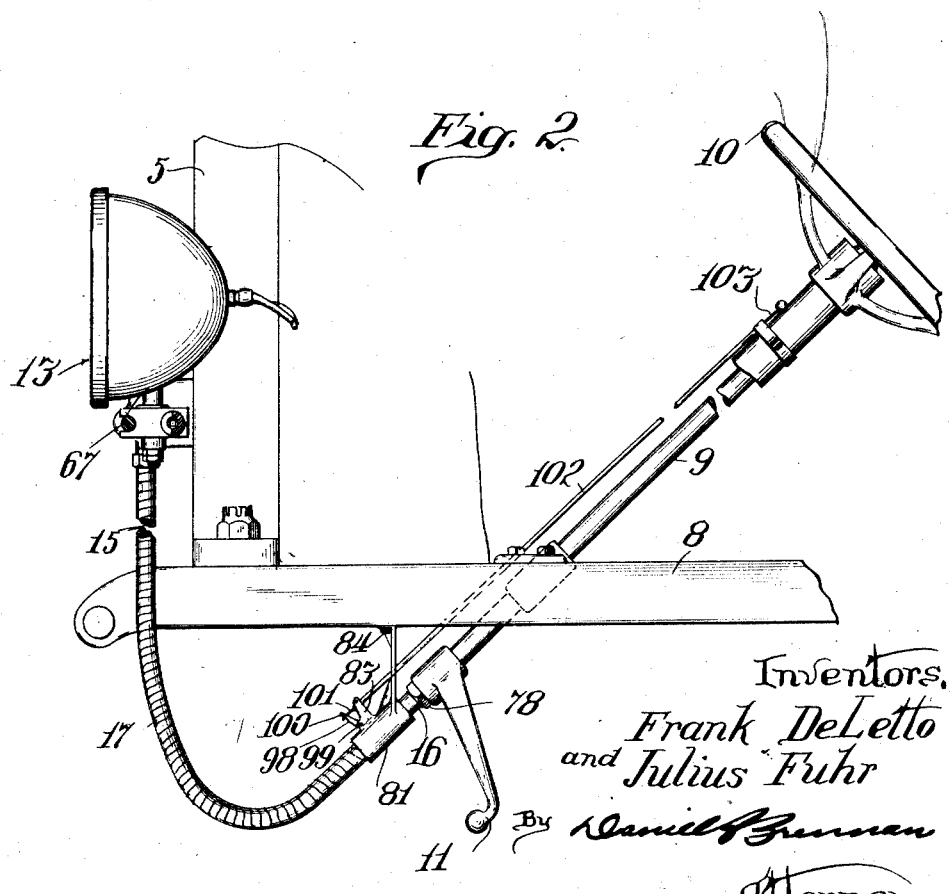
Figure 2 is a fragmentary side elevational view of the same.

Referring first to Figures 1 and 2 of the drawing, the forward part of a standard well known make of automobile is shown, including the radiator 5, mud guards or so-called fenders 6 and 7, the frame 8 and steering post 9 having the usual steering wheel 10 and steering knuckle 11.

The headlights are usually two in number, indicated at 12 and 13, placed on either side and forward of the radiator, these headlights being supported and operated by the improved mechanism of our invention which latter includes, in general, the supporting structure generally designated 14, containing motion transmitting mechanism which is suitably connected by a flexible shaft 15 to the lower end 16 of the steering post 9. A suitable casing 17 is provided for the flexible shaft 15.

Referring now to Figures 3 to 6, in which the details are best shown, it will be observed that the supporting structure 14 includes end or foot portions 18 and 19, preferably castings of a convenient shape similar to those in Figure 7 and riveted or otherwise fixedly secured to the fenders 6 and 7. The foot portions 18 and 19 are provided with reduced projections 20 and 21 which are received in and engage complemental recesses formed in housing members 22 and 23 and secured as indicated at 24 and 25 by means of bolts.

The housing 22 is provided, as best shown in Figure 4, with a vertical circular well 26 having a reduced portion 27 forming an annular shoulder 28 therein. The housing 22 is, like the housing 23, a casting and is preferably provided with the lateral extension which serves to connect it to the foot portion 18 and with a complemental substantially coaxial extension 29 extending from the opposite side of the housing. The extensions thus referred to are connected by the squared channel portion 30 in which the complemental squared rack portion 31 of a reciprocating rod 32 is adapted to operate.

In the well 26 we mount the headlight 12 for rotation on a vertical axis, the headlight, to this end, having an opening 12ª in the bottom thereof through which a threaded shank 33 passes and on which latter a nut 34 is threaded to force the housing of the headlight on to an annular shoulder 35 formed on said shank. The shoulder 35 lies closely within the well 26 and thus excludes dust from entering the same, said shank 33 having a reduced portion 36 which receives a spur gear 37 normally in mesh with the teeth on the rack bar 31. The gear 37 is keyed, as at 38, to the portion 36 and a further reduced portion 39 of the shank 33 projects through the bottom of the recess 27 and the housing 22 by the provision of an opening 40. Roller or ball bearings 41 and 42 are placed beneath the gear 37 and between the outer threaded end 43 of the stud 39, locking nuts 44 serving to prevent forward displacement of the lamp and engaging one of the cones of the roller or ball bearing 42.

The extension 29 is received within a substantially cylindrical casing 45 which extends across the front portion of the vehicle and receives a portion of the housing 23, that is, said housing 23 has an extension 46 complemental to the extension 29 and reduced in diameter in the same manner to receive the end of the casing 45. The housing 23 is of slightly different shape from the housing 22 owing to the provision in this housing of reduction gearing, as best shown in Figures 3 and 5.

Similar to the housing 22, the housing 23 is provided with an extending portion 47 which is secured to the foot portion 19 by means of the bolt 25.

The housing 23 is also provided with a transverse squared opening 48 in which the rack portion 49 of the reciprocating bar 32 is slidable.

The housing 23, as best shown in Figure 5, is provided with a downwardly extending portion 50 externally threaded at 51 to receive a retaining nut 52, said retaining nut engaging a flange 53 on a sleeve 54, which latter is fixedly connected, by soldering or the like, to the flexible housing 17.

The extension 50 receives a stud shaft 55 vertically arranged in a central opening 56, said shaft having an enlarged upper end 57 to which a spur gear 58 is fixedly connected. The spur gear 58 meshes with an intermediate gear 59 which, in turn, is in meshing engagement with the rack bar 49. The lower end of the stud shaft 55 is threaded, as at 56, to receive one of the cones of the roller or ball bearing 60 and, similarly, a roller or ball bearing 61 is placed between the gear 58 and an enlarged portion 62 of the opening 56 so that the shaft 55 and gear supported thereby is freely rotatable without friction.

In order to prevent chattering or other lost motion, longitudinally, of the shaft 55 a head 63 is formed on the enlargement 57 of said shaft, and a set screw 64 passes through a closure 65 on the housing 23 and impinges upon the head 63. A lock nut 66 retains said set screw in adjusted position.

The two housings 22 and 23 project horizontally forwardly of the longitudinal axis of the casing 45, and these housings and said casing are reinforced against rotation or other displacement by the provision of a transverse lock bar 67, said lock bar lying in a groove 68 formed in the housing 22 and passing through a slot 69 formed in the housing 23. The ends of the lock bar 67 are threaded and pass through the fenders 6 and 7 to receive lock nuts 70, 70.

The shaft 55 is connected to the flexible shaft 15 by the provision of a sleeve 71 to which said shaft 15 is fixedly connected by soldering or the like, said sleeve 71 having an internally threaded recess 72 for receiving the threaded extremity 56 of the shaft 55. The recess 72 is provided with an enlarged tapering portion 73 and a wedge nut 74 is threaded on to the portion 56 of the shaft 55 and enters the enlarged recess 73 to lock the shaft 55 against rotation in the sleeve 71 and thus connect said shaft to the flexible shaft 15. As best shown in Figure 14, the wedge nut 74 is provided with a plurality of longitudinal slots 75 which allow for expansion and contraction of the nut and render the same sufficiently flexible to allow it to grasp the threaded extremity 56 of the shaft 55 and thus perform its locking function.

The flexible shaft 15, as hereinbefore pointed out, is connected to the lower extremity of the steering post 9 and this connection is afforded by the structure best shown in Figure 6. It will be observed that the steering post 9 is provided with a lower threaded extremity 77 which projects beyond the steering knuckle 11 and receives a sleeve nut 78 held against rotation thereon by a transverse key 79. The outer end of the nut 78 is reduced and preferably cylindrical for reception in a bearing member 80 threaded into the clutch casing 81. The cylindrical portion of the nut 78 is reduced and preferably cylindrical for reception in a bearing member 80 threaded into the clutch casing 81. The cylindrical portion of the nut 78 is axially arranged in the clutch casing, and the end of the nut presented in said casing is provided with a transverse slot 82 which is adapted to engage with the movable part of the clutch hereinafter described. The casing 81 is preferably fixedly mounted on the bottom of the frame 8 by the provision of an integral arm 83 extending at an angle from said casing whereby the latter will be inclined and coaxial with the steering post. A bolt, or the like, 84, secures the arm 83 to the under side of the frame 8 or to any other convenient part of the vehicle.

The clutch mechanism preferably includes a male member 85 provided with a head 86 having a transverse integral key 87 adapted to engage in the slot 82 on the nut 78, said male member 85 being reciprocable in the casing 81 and fixedly connected at 88 to the adjacent end of the flexible shaft 15. The member 85 is provided with enlarged spaced portions 89 and 90 affording a circumferential groove 91, the portions 89 and 90 being guided in recesses 92 and 93 formed in the end wall 94 and the intermediate partition 95 of the clutch casing 81.

A helical spring 96 surrounding the male member 85 is disposed between the head 86 and the plate 97 to force the clutch member 86 into engagement with the slot in the nut 78.

The movable clutch member is shifted by the provision of a lever 98 pivoted at 99 in suitable lugs formed on the casing 81, said lever having a fork 100 which projects into the casing 81 and lies in the groove 91. The lever 98 is connected by a flexible wire rod or the like, 101, through a casing 102 and extends upwardly along the steering post to a point indicated at 103 whereby said clutch may be operated from the driver's position.

It will be obvious that at the will of the driver, the head lamps may be disconnected from the steering mechanism so that they do not operate with the steering mechanism. However, when the clutch is released, it automatically engages the nut 78 so that the headlights are operated by the steering mechanism. It will be noted from the nature of the slot in the nut and the position of the clutch member that it cannot engage the headlights with the steering gear unless the latter is in the medial position, that is, the steering wheels are set for straight running unless the lamps are turned to the point whereby the clutch will engage, in which event the lamps will automatically line up with the direction in which the steering wheels are turned. In this way the operator cannot, without completely reversing the headlights, connect them the wrong way to the steering mechanism.

The structure so far described is particularly adapted for application to a standard make of automobile in common use at the present time in which no intermediate gearing is provided between the steering wheel and the steering mechanism, but in instances where a worm drive steering mechanism is employed, such as in other more expensive makes of automobiles, it is necessary that a modified form of the clutch mechanism and connection be provided for connecting the headlights to this type of steering mechanism and to this end the structure shown in Figure 10 is provided.

In Figure 10 a portion of the frame is shown at 104 and the steering post at 105. The steering post 105 is the lower end thereof provided with a worm, not shown, arranged in a casing 106 and this worm is engaged with a worm gear not shown arranged in a gear housing 107. The gear in the gear housing 107 is connected to a shaft 108 which extends through the frame 104 and carries an arm 109 which connects with the steering mechanism of the automobile, that is, connects with levers for operating the steering wheels. This structure is standard and needs no further detailed description.

The clutch mechanism, as employed by us for connection to the shaft 108, is indicated generally at 110 and is substantially identical with the structure shown in Figure 6 and need not be described in detail, it being noted that the flexible shaft 15ª extends into a casing 81ª wherein the clutch mechanism itself is arranged.

The member 80ª, shown in Figure 10, corresponds to the member 80 shown in Figure 6 but is made longer so as to extend into and be fixedly engaged with a casing 111, a shaft 112 having a bevel gear 113 thereon being arranged in the bar member 80ª and engaged with the clutch. The casing 111 is provided with a closure member 111ª, and opposed to said closure member is a ball bearing structure 114 which supports a stud shaft 115 extending through the opposite wall of the casing 111 and being in threaded engagement with the end of the shaft 108 and secured by lock washer 116. The shaft 115 carries a bevel gear 117 which meshes with the bevel gear 113 so that rotation of the shaft 108 is imparted to the shaft 15ª through said gearing. The casing 111 is secured to the frame 104 by the provision of an integral arm 118 fastened to the frame 104 by means of a bolt 119.

Referring now to Figures 7 to 9 wherein a further alternative form of the invention, hereinafter described, is shown, we provide foot portions 18ª and 19ª which are secured to the opposite fenders of the vehicle. The foot portions are provided with outwardly extending members 20ª and 21ª cut away to receive the closure and bearing members 22ª and 23ª of the casing 22ᵇ and 22ᶜ. Bolts 120 pass through the members 20ª and 22ª and 21ª and 22ª to rigidly secure the housings 22ᵇ and 22ᶜ to the foot portions 18ª and 19ª. To this end the members 22ª, in each instance, are provided with enlarged externally threaded portions 121 and 122 which are threaded into the recesses 123 and 124 of the housing members 22$^b$ and 22$^c$.

The housings 22$^b$ and 22$^c$ are provided against rotation by a transverse supporting bar 125, which latter lies in grooves 126 and 127 formed in the adjacent faces of the housing members 22$^b$ and 22$^c$.

The housing members 22$^b$ and 22$^c$ are provided with complemental post bearing portions 128 and 129 arranged in axial alinement to support a revoluble shaft 130 which extends from one housing to the other. A dust proof casing 131 surrounds the bearing portions 128 and 129 and stud shaft 130 for an obvious purpose.

The housings 22$^b$ and 22$^c$ are arranged to support the two headlights of the vehicle and for supporting one of said headlights the housing 22$^b$ is provided with a threaded aperture 132 in its upper wall closed by a bearing plug 133. The bearing plug 133 supports a vertical stud shaft 134 passing through said plug and being mounted for rotation therein by means of the roller or ball bearings 135 and 136 arranged in recess in the upper and lower faces of the plug. The stud shaft 134 is provided with a collar 137 and a threaded extension 138 connected to the headlight in the same manner as shown in Figure 4.

The lower or inner end of the stud shaft 134 is reduced in size, as at 139, to receive a bevel gear 140 retained thereon by means of the threaded portion 141 and a lock nut 142.

The shaft 130 and its end adjacent to the housing 22$^b$ is reduced in size, as at 130$^a$, and supported in a roller or ball bearing 143 retained in the housing bearing portion 128. The reduced portion 130$^a$ of the shaft 130 is threaded, as at 144, to receive a bevel gear 145 meshing with the bevel gear 140 and a lock nut 146 retains the bevel gear 145 against displacement. To prevent endwise movement of the shaft 130 a stud 147 projects from the threaded enlargement 121 and abuts the end 130$^a$ of said shaft.

The plug 133 is adjustable in the housing 22$^b$ and retained in proper position by means of a lock nut 133$^a$.

The opposite end of the shaft 130 from that on which the casing 22 is connected extends through the chamber 124 of the housing member 22$^c$ and is reduced in size, as at 130$^b$, for reception in a reduced recess 150 in the enlarged closure 122. The closure 122 supports a roller or ball bearing structure 151 for the reduced end of the shaft 130, and a bevel gear 152 is keyed, as at 153, to said reduced portion 130$^b$.

The lamp support in the casing of Figure 9 is indicated generally at 138$^a$ and is substantially identical in construction with the structure shown in Figure 8 and therefore need not be described in detail, it being noted that a bevel gear 154 connects the lamp support 138 to the bevel gear 152.

In order to impart rotative motion to the shaft 130, and hence to the lamps on their respective supports, we provide a flexible shaft 15$^b$ arranged in a flexible casing 17$^b$ and extending to the steering gear of the automobile and connected, if desired, in the same manner as that shown in Figure 6.

The shaft 15$^b$ is connected to a stud shaft 155 and this stud shaft, with the exception of the details as to size, is connected by a wedge connection 156 to the shaft 15$^b$. As the structure shown at the bottom of Figure 9 is substantially identical with that shown in Figure 5, a detailed description of the same need not be incorporated here. A bevel gear 157 is carried by the stud shaft 155 and meshes with the bevel gear 152. The shaft 155 is supported in roller or ball bearings 158 and 159 and with the plug 160 is removable as a unit from the housing 22$^c$.

In some instances it is desired to operate only a so-called spotlight by means of the steering mechanism, the main headlights remaining fixed. It is desirable in such an apparatus that it be readily adjustable to a desired point on the vehicle so as to be placed where it will not interfere with the vision of other drivers going in the opposite direction and at the same time so that it will throw the rays of light on the road. To this end we have provided the structure shown in Figures 11, 12 and 13.

Referring first to Figure 11, a portion of the front end of a motor vehicle is shown, the fixed headlight being indicated at 161 and supported in the usual manner, as at 162. A transverse reinforcing bar 163 extends across the front of the vehicle and we employ this bar as the major support for the dirigible spotlight, as indicated at 164 and is of the usual construction, that is, is provided with a shell 165 having an internally threaded stud 166 for receiving the threaded upper end 167 of the stud shaft 168.

Through the mechanism which we are about to describe, said stud shaft 168 is connected to the steering mechanism of the vehicle, this connecting mechanism including a flexible shaft 169 connected in a flexible casing 170.

In the form of the invention best shown in Figures 12 and 13, we provide a single casting having a body portion 171 formed with a rearward extension 172 which is provided with a groove 173 which receives the rod 163, said extension 172 overlying the said rod. A clamping jaw 174 having a groove 175 engages the end side of the bar 163, and said extension 172 and member 174 are brought into clamping engagement with the bar by the provision of bolts 176, it being practicable to adjust the casting 171 to any desired point on said bar. The main body portion of the casting is provided with a gear chamber 177 which extends across the body portion and is provided with staggered threaded openings 178 and 179.

In the opening 178 we arrange a plug bearing member 180 having a roller or ball bearings 181 and 182 for the stud shaft 168 and serving to support said shaft in proper position in body member 171. On the lower end of the shaft 168 we mount a bevel gear 183 which in the same manner as the bevel gear 140 is connected to the shaft 134.

In the opening 179 we provide a bearing plug member 180ª substantially identical in construction with the plug member 180 and having ball or roller bearings 181ª and 182ª for supporting a stud shaft 184 which is connected by a wedge connection 185 to the shaft 169. This wedge connection 185 is similar to that shown in Figure 5 and indicated at 156 in Figure 9 and need not be described in detail here. The stud shaft 184 carries a bevel gear 186 which is in meshing engagement with the bevel gear 183 so that upon rotation of the stud shaft 184 a complemental rotation in the opposite direction of the shaft 168 will take place.

The spotlight may be connected to the steering mechanism of the vehicle in any convenient manner or it may be connected by either of the mechanisms shown in Figures 6 or 10 as desired.

We claim:

1. In combination with the fenders of an automobile, a supporting structure provided at each end with a foot resting against and secured to the corresponding fender; a lock bar extending between said fenders adjacent said supporting structure, said bar extending through said feet and engaging said structure between its ends to prevent turning of the latter; adjustable lights on said structure; and means for adjusting said lights.

2. In combination with the fenders of an automobile, a supporting structure secured at each end to said fenders; vertical shaft bearings on said structure for the head-lights of the automobile; vertical shafts mounted in said bearings; headlights on said shaft; a lock bar extending between said fenders, there being grooves in said bearings in which said lock bar rests; and means for simultaneously adjusting said shafts for adjusting said lights.

3. In combination with the fenders of an automobile, a supporting structure provided at each end with a foot resting against and secured to the corresponding fender; a lock bar extending between said fenders adjacent said supporting structure, said bar extending through said feet and engaging said structure between its ends to prevent turning of the latter; adjustable lights on said structure; and means operatively connected with the steering wheel of the automobile for adjusting said lights.

4. The combination with the steering wheel of an automobile, of a pair of adjustable headlights; means for simultaneously adjusting said headlights; a flexible shaft connected at one end to operate said light adjusting means; a steering shaft operatively connected with said steering wheel, the other end of said flexible shaft being arranged in longitudinal alignment with the end of said steering shaft; separable clutch members on said shafts and provided with a transverse interengaging slot and key; a spring holding said clutch members in engagement; a grooved collar on the clutch member on the end of said flexible shaft; a lever engaging the groove in said collar; and an operative member connected with said lever and leading to a position adjacent said steering wheel.

5. In combination, an adjustable automobile headlight; a shaft adjustably mounting said headlight; a flexible shaft arranged in longitudinal alignment with said first mentioned shaft; and a coupling between said shafts consisting of a sleeve connected to one of said shafts and having a tapered recess and a wedge nut on the end of the other shaft engaging said tapered recess.

6. In combination, an adjustable automobile headlight; a shaft adjustably mounting said headlights, the end of said shaft being threaded; a flexible shaft arranged in axial alignment with said first mentioned shaft; a sleeve on the end of said flexible shaft having a conical recess and at the bottom of said recess a threaded recess to receive the threaded end of said first mentioned shaft; and a split conical nut threaded on the end of said first mentioned shaft and engaging said conical recess.

7. In combination with the fenders of an automobile, a supporting structure provided at each end with a foot resting against and secured to the corresponding fender; vertical shaft bearings on said structure; vertical shafts in said bearings; headlights on the upper ends of said shafts; means connecting said shafts and compelling simultaneously operation thereof; a lock bar having threaded ends extending through said feet and fenders, said shaft bearings having grooves receiving said bar; a flexible shaft arranged in axial alignment with the lower end of one of said vertical shafts, said lower end of said vertical shaft being threaded; a sleeve secured to the end of said flexible shaft and having a conical recess and a threaded recess at the bottom of said conical recess to receive the threaded end of said vertical shaft; a split conical nut threaded on said threaded end of said shaft and engaging said conical recess; and means for operating said flexible shaft.

8. In combination with the fenders of an automobile, a supporting structure provided at each end with a foot resting against and secured to the corresponding fender; vertical shaft bearings on said structure; vertical shafts in said bearings; headlights on the upper ends of said shafts; means connecting said shafts and compelling simultaneous operation thereof; a lock bar having threaded ends extending through said feet and fenders, said shaft bearings having grooves receiving said bar; a flexible shaft arranged in axial alignment with the lower end of one of said vertical shafts, said lower end of said vertical shaft being threaded; a sleeve secured to the end of said flexible shaft and having a conical recess and a threaded recess at the bottom of said conical recess to receive the threaded end of said vertical shaft; a split conical nut threaded on said threaded end of said shaft and engaging said conical recess; a steering wheel and steering shaft for said automobile, the other end of said flexible shaft being arranged in axial alignment with said steering shaft; a transverse lug on the end of said flexible shaft, there being a corresponding transverse groove in the end of said steering shaft to receive said lug; a spring normally holding said lug in engagement with said groove; a grooved collar on said flexible shaft; a lever engaging said grooved collar; and an operative connection with said lever leading to a position adjacent said steering wheel.

In testimony whereof we affix our signatures at 10 South La Salle St., Chicago, Illinois.

FRANK DE LETTO.
JULIUS FUHR.